(12) United States Patent
Ukai

(10) Patent No.: US 11,711,416 B2
(45) Date of Patent: Jul. 25, 2023

(54) SIGNAL PROCESSING METHOD AND SIGNAL PROCESSING APPARATUS

(71) Applicant: YAMAHA CORPORATION, Hamamatsu (JP)

(72) Inventor: Satoshi Ukai, Hamamatsu (JP)

(73) Assignee: YAMAHA CORPORATION, Hamamatsu (JP)

( * ) Notice: Subject to any disclaimer, the term of this patent is extended or adjusted under 35 U.S.C. 154(b) by 0 days.

(21) Appl. No.: 17/564,539

(22) Filed: Dec. 29, 2021

(65) Prior Publication Data

US 2022/0224747 A1 Jul. 14, 2022

(30) Foreign Application Priority Data

Jan. 12, 2021 (JP) .................................. 2021-002750

(51) Int. Cl.
*H04L 65/80* (2022.01)
*G06V 40/16* (2022.01)
(Continued)

(52) U.S. Cl.
CPC ............ *H04L 65/80* (2013.01); *G06V 40/168* (2022.01); *H04L 65/65* (2022.05); *H04M 9/085* (2013.01); *H04M 2250/74* (2013.01)

(58) Field of Classification Search
CPC ..... H04L 65/80; H04L 65/65; H04L 43/0858; H04L 43/16; H04L 47/10; H04L 47/283;
(Continued)

(56) References Cited

U.S. PATENT DOCUMENTS 6,184,753 B1 * 2/2001 Ishimi .................... H03K 5/135
331/34
6,212,171 B1 * 4/2001 LaFollette ......... H04L 12/40078
370/257
(Continued)

FOREIGN PATENT DOCUMENTS

EP 1232642 A1 8/2002
JP 2014120830 A 6/2014
(Continued)

OTHER PUBLICATIONS

Extended European Search Report issued in European Appln. No. 22150692.6 dated May 16, 2022.

*Primary Examiner* — Oanh Duong
(74) *Attorney, Agent, or Firm* — Rossi, Kimms & McDowell LLP

(57) ABSTRACT

A signal processing method includes obtaining, by a signal processing apparatus, a network delay time with respect to a device connected to the signal processing apparatus via a network, obtaining an input signal, determining an allowable upper limit of a delay time for an output signal corresponding to the obtained input signal based on the obtained network delay time and a total allowable delay time, selecting a signal processing having a longest delay time that is less than or equal to the allowable upper limit of the delay time, performing the selected signal processing on the obtained input signal, and transmitting the obtained input signal on which the selected signal processing has been performed, as the output signal, to the device connected to the signal processing apparatus via the network.

20 Claims, 8 Drawing Sheets

(51) Int. Cl.
*H04L 65/65* (2022.01)
*H04M 9/08* (2006.01)

(58) Field of Classification Search
CPC ............ H04L 65/1069; H04L 43/0852; G06V 40/168; H04M 9/085; H04M 2250/74; H04W 24/08; G06N 3/04; G06N 3/08
See application file for complete search history.

(56) References Cited

U.S. PATENT DOCUMENTS

| | | | | |
|---|---|---|---|---|
| 6,628,276 | B1* | 9/2003 | Elliott | H04N 5/126 375/376 |
| 7,012,900 | B1* | 3/2006 | Riddle | H04L 43/0852 370/252 |
| 8,199,667 | B2 | 6/2012 | Li et al. | |
| 10,079,868 | B2* | 9/2018 | Bouazizi | H04W 4/06 |
| 10,412,434 | B1* | 9/2019 | Matthews | H04N 21/4394 |
| 10,432,534 | B2* | 10/2019 | Lee | H04L 47/30 |
| 2001/0026327 | A1* | 10/2001 | Schreiber | H04N 21/8106 348/518 |
| 2003/0169746 | A1* | 9/2003 | Kitazawa | H04L 47/24 370/395.42 |
| 2004/0264488 | A1* | 12/2004 | Yoon | H04W 28/02 370/412 |
| 2005/0094628 | A1 | 5/2005 | Ngamwongwattana | |
| 2012/0307885 | A1* | 12/2012 | Agarwal | H04W 72/1278 375/E7.126 |
| 2013/0010890 | A1* | 1/2013 | Picco | H04J 3/0682 375/295 |
| 2015/0327192 | A1 | 11/2015 | Amano | |
| 2019/0332875 | A1* | 10/2019 | Vallespi-Gonzalez | G06F 16/29 |
| 2021/0029009 | A1* | 1/2021 | Li | H04L 43/0852 |

FOREIGN PATENT DOCUMENTS

| | | | | |
|---|---|---|---|---|
| KR | 2006083051 A | * | 7/2006 | ............ G06Q 50/10 |
| WO | 0122710 A2 | | 3/2001 | |

* cited by examiner

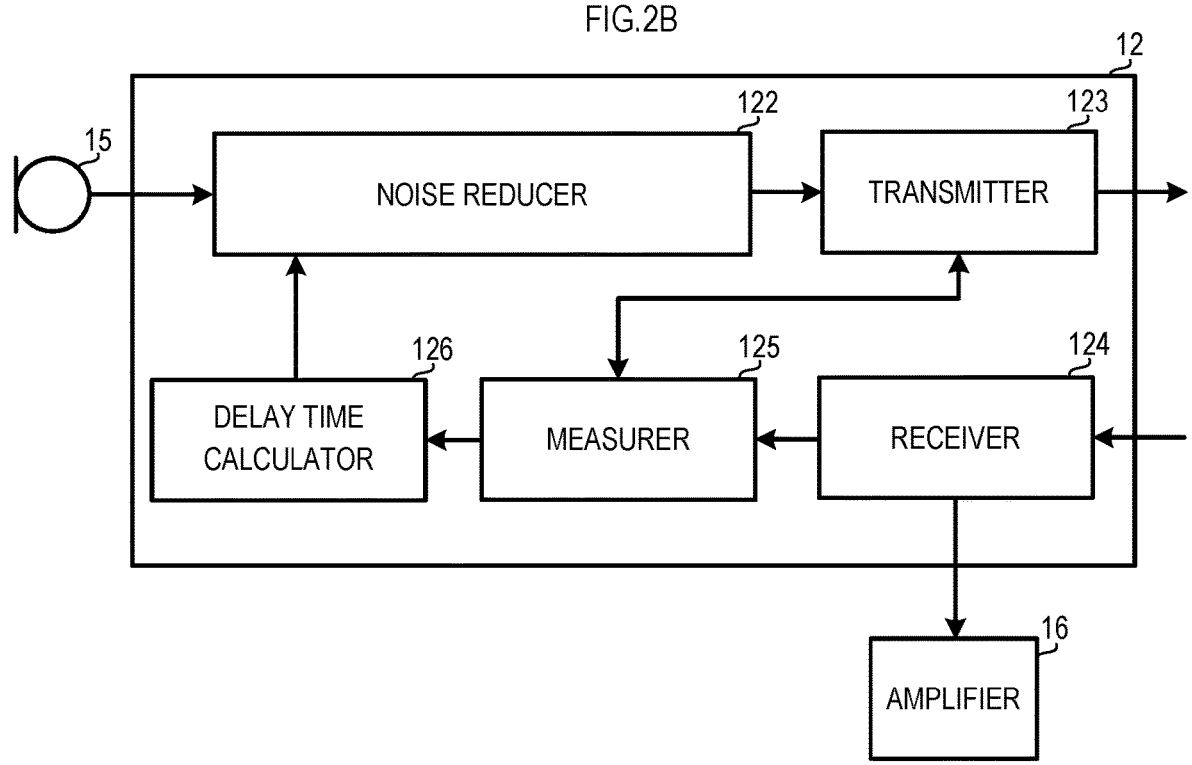

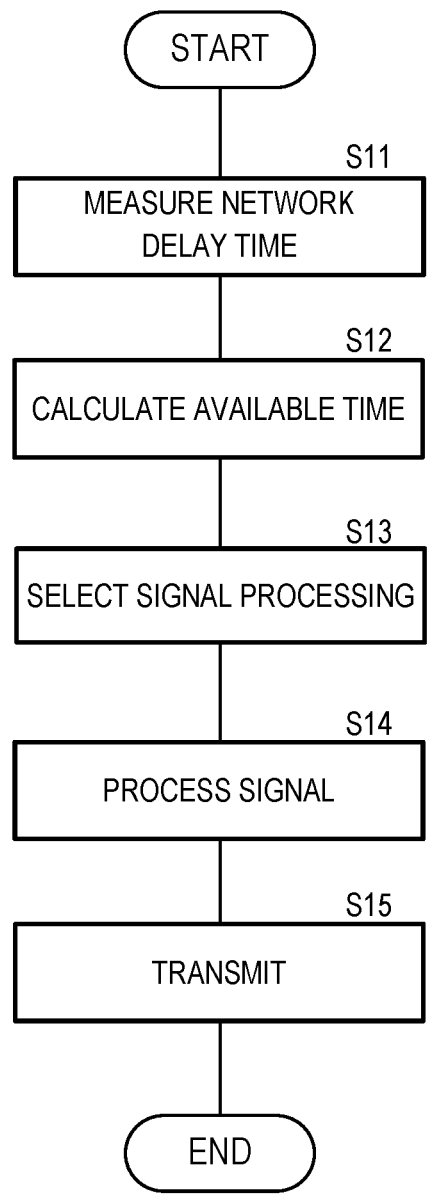

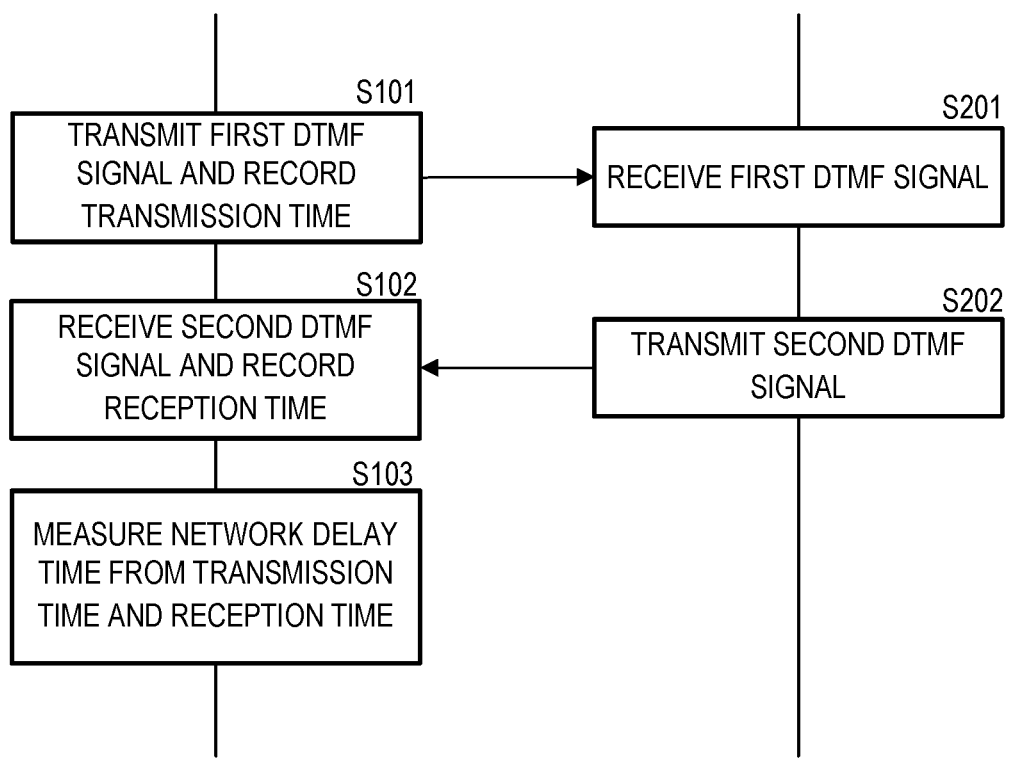

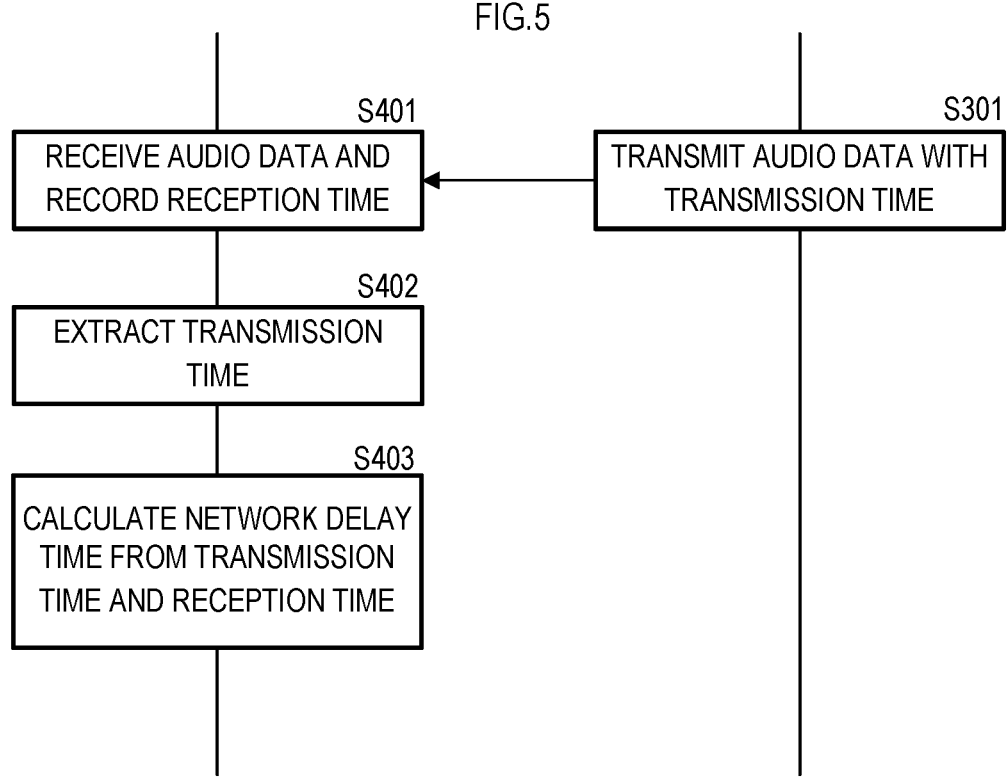

SIGNAL PROCESSING METHOD AND SIGNAL PROCESSING APPARATUS

CROSS REFERENCE TO RELATED APPLICATIONS

This Nonprovisional application claims priority under 35 U.S.C. § 119(a) on Patent Application No. 2021-002750 filed in Japan on Jan. 12, 2021, the entire contents of which are hereby incorporated by reference.

BACKGROUND

Technical Field

An embodiment of the present disclosure relates to a signal processing method and a signal processing apparatus that process an audio signal or a video signal.

Background Information

Japanese Unexamined Patent Application Publication No. 2014-120830 discloses a configuration in which a delay time in wireless communication is measured, and, among a plurality of encoder parameters, an encoder parameter with the shortest delay time is set.

Delay in communication with a device at a remote place includes a delay time by signal processing, and a network delay time. A user feels uncomfortable when a sum of the delay time exceeds a predetermined period of time.

The configuration disclosed in Japanese Unexamined Patent Application Publication No. 2014-120830 sets the encoder parameter with the minimum delay time, so that the user feels less uncomfortable. However, the configuration of Japanese Unexamined Patent Application Publication No. 2014-120830, since setting the encoder parameter with the minimum delay time, may reduce accuracy of the signal processing.

SUMMARY

In view of the foregoing, an object of an embodiment of the present disclosure is to provide a signal processing method and a signal processing apparatus that increase accuracy of signal processing without making a user feel uncomfortable.

Solution to Problem

A signal processing method according to an embodiment of the present disclosure includes obtaining, by a signal processing apparatus, a network delay time with respect to a device connected to the signal processing apparatus via a network, obtaining an input signal, determining an allowable upper limit of a delay time for an output signal corresponding to the obtained input signal based on the obtained network delay time and a total allowable delay time, selecting a signal processing having a longest delay time that is less than or equal to the allowable upper limit of the delay time, performing the selected signal processing on the obtained input signal, and transmitting the obtained input signal on which the selected signal processing has been performed, as the output signal, to the device connected to the signal processing apparatus via the network.

According to an embodiment of the present disclosure, it is possible not to make a user feel uncomfortable and to improve accuracy of signal processing.

BRIEF DESCRIPTION OF THE DRAWINGS

FIG. 2B is a block diagram showing a functional configuration of the processor 12.

FIG. 3 is a flow chart showing an operation of a signal processing program 141.

FIG. 4 is a flow chart showing a detailed operation of measurement of a network delay time.

FIG. 5 is a flow chart showing a measurement operation of a network delay time according to a modification.

DETAILED DESCRIPTION

Figure 1:
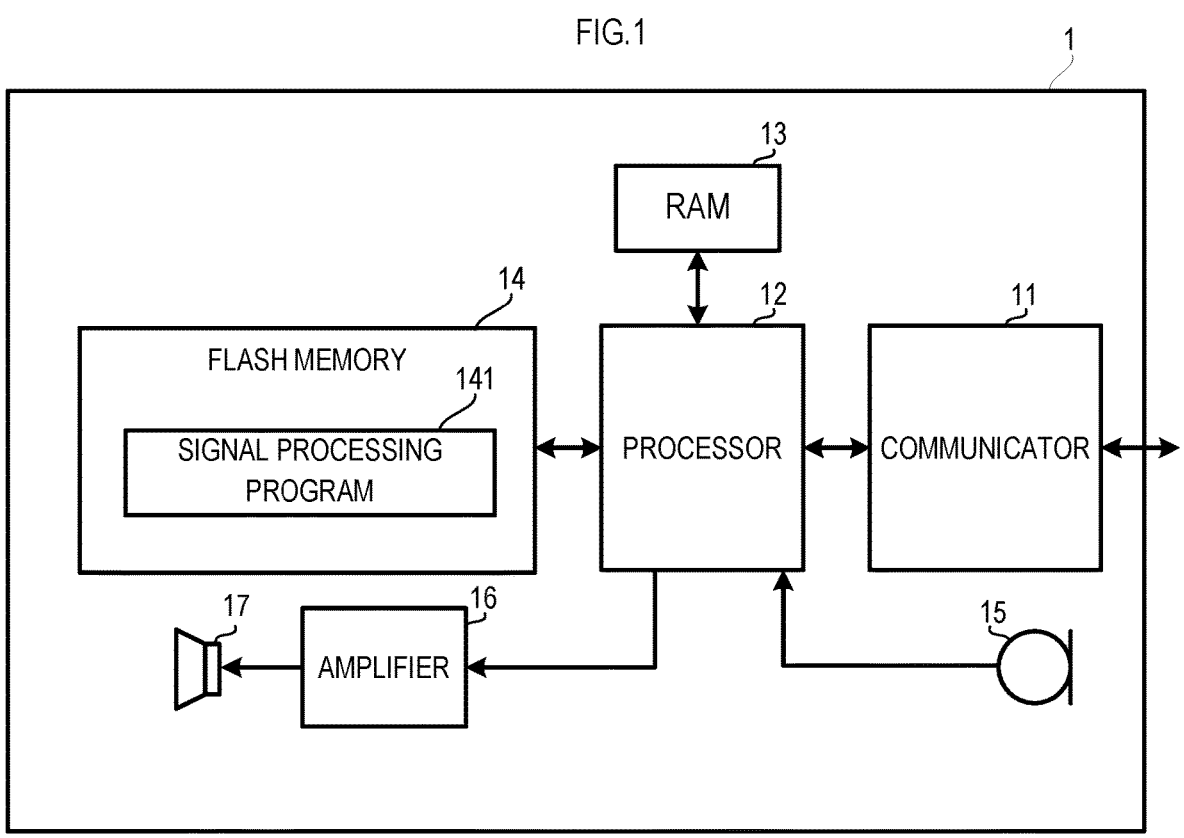
FIG. 1 is a block diagram showing a configuration of a signal processing apparatus 1.

FIG. 1 is a block diagram showing a configuration of a signal processing apparatus 1. The signal processing apparatus 1 includes a communicator 11, a processor 12, a RAM 13, a flash memory 14, a microphone 15, an amplifier 16, and a speaker 17.

The signal processing apparatus 1 configures a remote conversation device connecting to a device at a remote place and transmitting and receiving audio data, for example. The signal processing apparatus 1 performs predetermined signal processing on an audio signal obtained by the microphone 15. The signal processing apparatus 1 transmits the audio signal on which the signal processing has been performed, as audio data, to a far-end side. In addition, the signal processing apparatus 1 outputs sound from the speaker 17, based on the audio signal of the audio data received from the far-end side.

The communicator 11 connects to the remote conversation device on the far-end side through a network, and transmits and receives the audio data with the remote conversation device on the far-end side.

The processor 12 reads a program from the flash memory 14 being a storage medium, and temporarily stores the program in the RAM 13, and thus performs various operations. The program includes a signal processing program 141. The flash memory 14 further stores a program for operating the processor 12, such as firmware.

The microphone 15 is an example of an input signal obtainer, and obtains various types of sound such as voice of a talker and noise, as an audio signal. The microphone 15 performs digital conversion on an obtained audio signal. The microphone 15 outputs a digitally converted audio signal to the processor 12.

The processor 12 performs predetermined signal processing on the audio signal obtained by the microphone 15. For example, the processor 12 performs noise reduction processing on the audio signal obtained by the microphone 15. In addition, the processor 12 performs echo reduction processing on the audio signal obtained by the microphone 15. The processor 12 transmits the audio signal on which the signal processing has been performed, as audio data, to the far-end side through the communicator 11. In addition, the processor 12 outputs the audio data received through the communicator 11, as an audio signal, to the amplifier 16.

The amplifier 16 performs analog conversion on the audio signal received from the processor 12, and amplifies the audio signal. The amplifier 16 outputs an amplified audio signal to the speaker 17. The speaker 17 outputs sound based on the audio signal outputted from the amplifier 16.

Figure 2A:
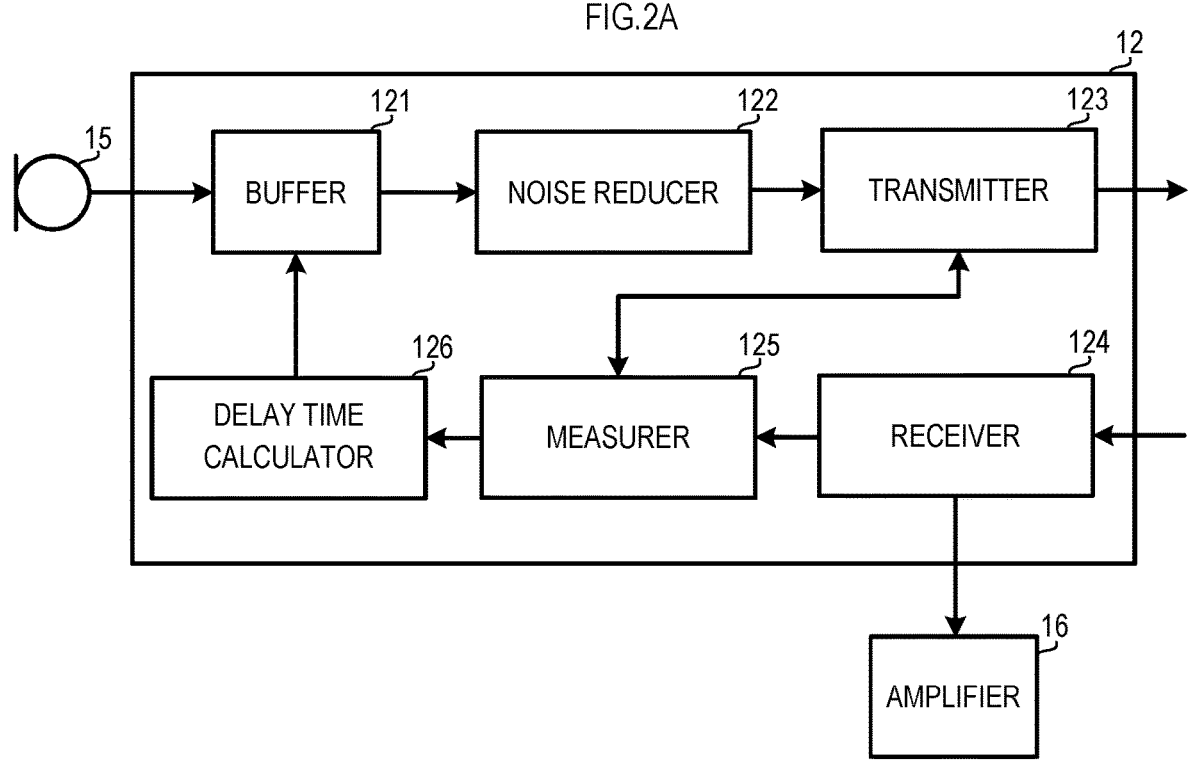
FIG. 2A is a block diagram showing a functional configuration of a processor 12.

The processor 12 performs an audio signal processing method of the present disclosure. FIG. 2A is a block diagram showing a functional configuration of the processor 12. The processor 12 functionally configures a buffer 121, a noise reducer 122, a transmitter 123, a receiver 124, a measurer 125, and a delay time calculator 126. The configurations are implemented by the signal processing program 141.

The buffer 121 temporarily stores the audio signal obtained by the microphone 15 for a predetermined period of time. The noise reducer 122 is an example of a signal processor, and performs noise reduction processing, using the audio signal stored in the buffer 121. The transmitter 123 transmits the audio signal of which the noise has been reduced by the noise reducer 122, as audio data, to an apparatus of a connection destination. The receiver 124 receives the audio data from the apparatus of a connection destination, and outputs the audio data to the amplifier 16, as an audio signal. The measurer 125 measures a network delay time. The delay time calculator 126, based on the network delay time, calculates an allowable upper limit of the delay time that occurs in an output signal with respect to an input signal by performing signal processing in the signal processing program 141. In addition, the delay time calculator 126 selects signal processing with the longest delay time less than or equal to the upper limit.

FIG. 3 is a flow chart showing an operation of the signal processing program 141. The measurer 125 measures a network delay time (S11). FIG. 4 is a flow chart showing a detailed operation of measurement of the network delay time. The measurer 125 first transmits a first DTMF (Dual-Tone Multi-Frequency) signal as a signal for a test, to an apparatus of a connection destination through the sender 123, and records a transmission time (S101). The first DTMF signal is embedded, for example, in the payload of VoIP (Voice over Internet Protocol).

The apparatus of a connection destination receives the first DTMF signal (S201). The apparatus of a connection destination transmits a second DTMF signal (S202) as a response to the first DTMF signal. The second DTMF signal is also embedded, for example, in the payload of VoIP. The measurer 125 receives the second DTMF signal through the receiver 124, and records a reception time (S102). The measurer 125 measures the network delay time from a difference between the transmission time and the reception time that have been recorded (S103).

The network delay time corresponds to a time difference between transmission of certain data and reception of the certain data by the apparatus of a connection destination. The difference between the transmission time and the reception time that have been recorded by the measurer 125 is a time difference between transmission of certain data and reception of a response. Therefore, the measurer 125 measures half the time difference between the transmission time and the reception time that have been recorded, as a network delay time.

It is to be noted that the measurement of the network delay time may be taken during conversation but is preferably taken immediately after connection between the apparatuses is established. As a result, the measurer 125 does not interfere with the conversation, by sound of the DTMF signals.

In a case in which the measurement of the network delay time is taken during conversation, the measurer 125 does not preferably affect the conversation between users, for example, by embedding the signal for a test in a high-frequency band (a band of about 20 kHz, for example).

In addition, the measurer 125 may measure the network delay time by adding specific frequency characteristics or phase characteristics to an audio signal of a conversation sound. The measurer 125 adds a dip to a specific frequency (1 kHz, for example) of an audio signal, for example. An apparatus of a transmission destination, in a case of detecting the dip in the frequency, transmits a reply. The reply may be the second DTMF signal or may add the specific frequency characteristics or the phase characteristics to the audio signal of a conversation sound.

It is to be noted that the measurer 125 may embed special information corresponding to the first DTMF signal in a header of an RTP (Real-time Transport Protocol) packet instead of the payload in VoIP, for example. The apparatus of a transmission destination, in a case of extracting the special information in the header of the RTP packet, transmits a reply. The reply may be the second DTMF signal or may embed reply information in the header of the RTP packet.

In addition, the measurer 125 may obtain the transmission time of packet data received from the apparatus of a connection destination, from a remote conversation program (a program to transmit and receive audio data). FIG. 5 is a flow chart showing a measurement operation of a network delay time according to a modification. In the modification, the remote conversation program transmits audio data with a transmission time.

The apparatus of a transmission destination transmits audio data with a transmission time (S301). The measurer 125 receives the audio data through the receiver 124, and records a reception time (S401). The measurer 125 extracts the transmission time from the received audio data (S402). The measurer 125 calculates a network delay time from a difference between the extracted transmission time and the recorded reception time (S403).

The remote conversation program transmits audio data with a transmission time in this example, so that the transmission and reception of a test signal such as a DTMF signal is unnecessary. In addition, in this example, the measurer 125, since using time information added to the audio data of a conversation sound, does not affect conversation between users even when taking the measurement during the conversation.

Returning to FIG. 3, the delay time calculator 126 calculates the upper limit, based on the network delay time that the measurer 125 has measured (S12). For example, the upper limit corresponds to a difference between the total allowable delay time (200 msec, for example) to the extent that a user does not feel uncomfortable and the network delay time. In a case in which the network delay time is large, the upper limit is reduced, and the upper limit is increased in a case in which the network delay time is small.

In addition, the delay time calculator 126 selects signal processing with the longest delay time less than or equal to the calculated upper limit (S13). In the example of FIG. 2A, the delay time calculator 126 changes a buffer amount of the buffer 121 without changing processing content of the noise reducer 122. In other words, the delay time calculator 126 sets the buffer amount to the largest less than or equal to the upper limit. The noise reducer 122 performs noise reduction processing, using the audio signal temporarily stored with the set largest buffer amount (S14). The transmitter 123 transmits the audio signal on which the noise reduction processing has been performed, to the apparatus of a connection destination (S15).

The noise reduction processing is an example of processing to determine a target signal and cause the target signal to pass. The noise reduction processing causes the target sound (voice) to pass, and reduces other sound as noise. For example, the noise reduction processing is filter processing to convert a certain input signal into a certain output signal, using a predetermined algorithm such as a learned neural network (especially, the Convolutional Neural Network (CNN), the Recurrent Neural Network (RNN), or the Long-Short Term Model (LSTM)). The algorithm of the filter processing is constructed by machine learning. The noise reducer 122 previously repeats processing and learning to convert a certain inputted audio signal into an audio signal of which the noise has been reduced, and constructs a learned model. The noise reducer 122 performs the noise reduction processing, using the learned model.

The accuracy of the noise reduction processing using such a learned neural network depends on an amount of information of an input signal. The accuracy of the noise reduction processing is increased as the amount of information of an input signal is large. The delay time calculator 126 according to the present embodiment sets the buffer amount to the largest less than or equal to the upper limit. Therefore, the accuracy of the noise reducer 122 is set to be the highest less than or equal to the upper limit.

As described above, in a case in which the network delay time is large, the upper limit is reduced, and the upper limit is increased in a case in which the network delay time is small. In short, the signal processing apparatus 1 according to the present embodiment performs highly accurate noise reduction processing in a good communication environment, and performs the noise reduction processing without delay to the extent that a user does not feel uncomfortable even in a poor communication environment. Therefore, the signal processing apparatus 1 is able to perform optimal noise reduction processing according to the communication environment.

The above embodiment shows an example in which the processing content of the noise reducer 122 is not changed and the buffer amount of the buffer 121 is set to the largest, as an example of selecting signal processing with the longest delay time less than or equal to the upper limit. However, the delay time calculator 126 may change the content of the signal processing of the noise reducer 122. For example, the delay time calculator 126 may change an algorithm according to the upper limit.

For example, as shown in FIG. 2B, the processor 12 may not include the buffer 121, and may directly input the audio signal obtained by the microphone 15 into the noise reducer 122. In such a case, the delay time calculator 126 may change the content of the signal processing of the noise reducer 122. For example, the delay time calculator 126 may select signal processing with the longest delay time less than or equal to the upper limit, such as the recurrent neural network or the LSTM. The recurrent neural network and the LSTM, since having an internal variable, is also able to be configured not to explicitly have a buffer that stores the audio signal obtained by the microphone 15.

The above embodiment shows the noise reduction processing as an example of signal processing. However, the signal processing is not limited to the noise reduction processing. For example, echo reduction processing may be performed as signal processing. In the echo reduction processing, the delay time calculator 126 sets the buffer amount to the largest less than or equal to the upper limit.

In addition, the signal processing may be processing to perform speech recognition processing and convert speech into text data. Moreover, the signal processing may perform determination (speech recognition) of voice of a specific talker, and may perform processing to emphasize the voice of a specific talker or reduce the voice of a specific talker.

Figure 6:
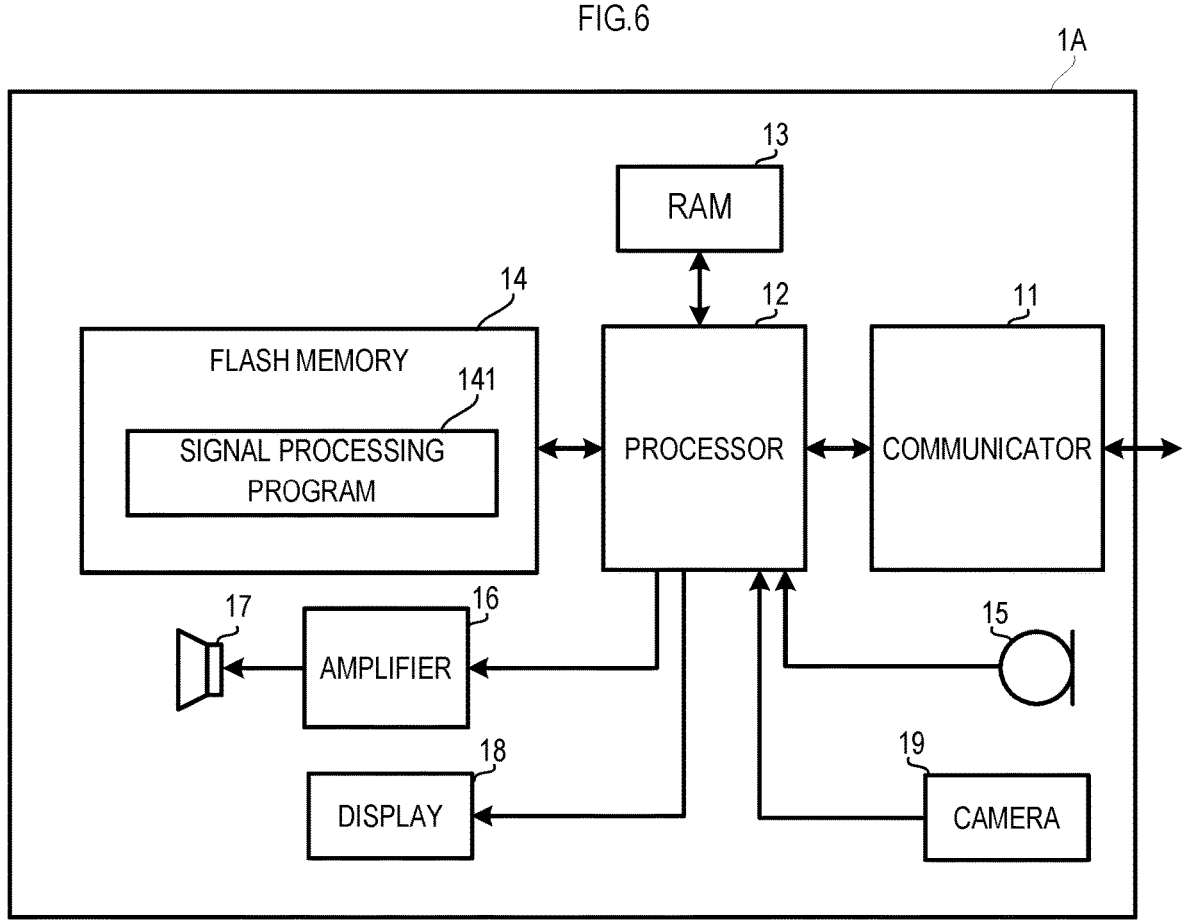
FIG. 6 is a block diagram showing a configuration of a signal processing apparatus 1A according to a first modification.

In addition, the signal processing is not limited to processing on an audio signal. FIG. 6 is a block diagram showing a configuration of a signal processing apparatus 1A according to a first modification. The same reference numerals are used to refer to components common to FIG. 1, and the description will be omitted. The signal processing apparatus 1A further includes a display 18 and a camera 19 in addition to the components of the signal processing apparatus 1.

Figure 7:
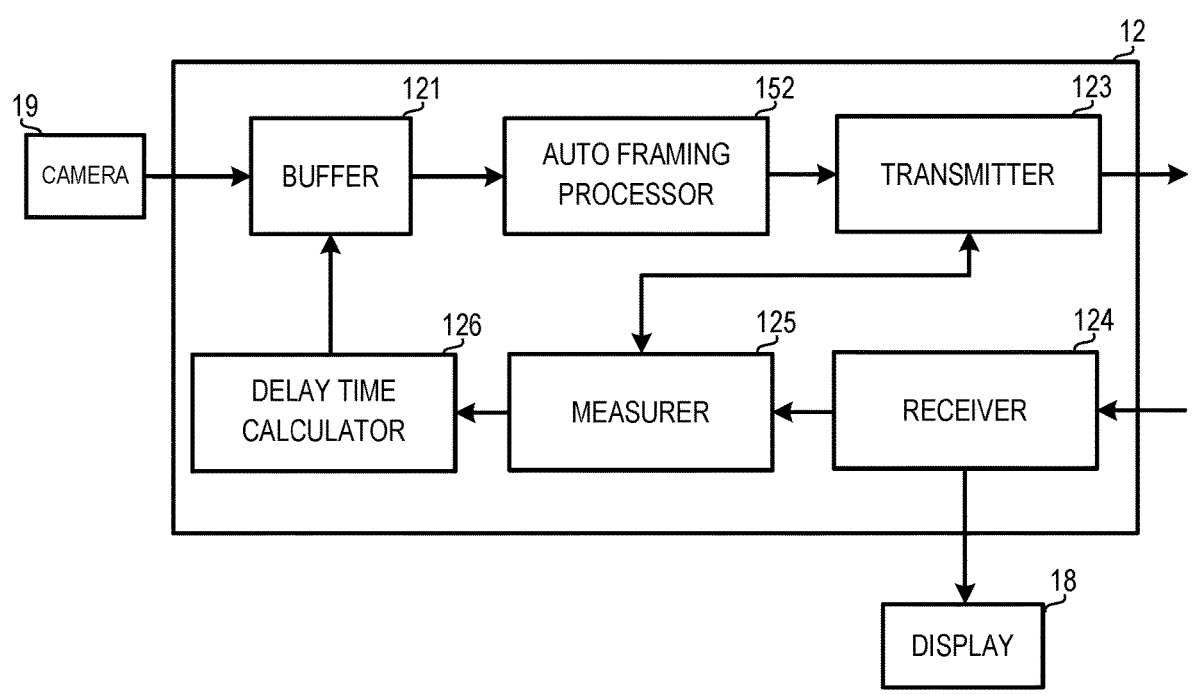
FIG. 7 is a block diagram showing a functional configuration of a processor 12 in the signal processing apparatus 1A.

FIG. 7 is a block diagram showing a functional configuration of a processor 12 in the signal processing apparatus 1A. The same reference numerals are used to refer to components common to FIG. 2A, and the description will be omitted. The processor 12 of the signal processing apparatus 1A includes an auto framing processor 152 in place of the noise reducer 122. Other configurations are the same as the configurations of the processor 12 in the signal processing apparatus 1.

The buffer 121 stores a video signal captured by the camera 19 for a predetermined period of time. The auto framing processor 152 performs auto framing processing to extract and enlarge a face of a talker in the video signal stored in the buffer 121. The auto framing processing is an example of processing to determine a target signal and cause the target signal to pass.

More specifically, the auto framing processing is processing to perform face recognition (image recognition) and extract a recognized face portion. The auto framing processing may be processing to extract a face image of a specific talker. In addition, the auto framing processing may be processing to extract only a face image of a talker during conversation.

As with the noise reduction processing, the auto framing processing is filter processing to convert a certain input signal into a certain output signal, using a predetermined algorithm such as a neural network, for example. The algorithm of the auto filter processing is also constructed by machine learning.

The accuracy of the auto framing processing using such a neural network also depends on an amount of information of an input signal. The delay time calculator 126 sets the buffer amount to the largest less than or equal to the upper limit. Therefore, the accuracy of the auto framing processor 152 is set to be the highest less than or equal to the upper limit. In addition, the delay time calculator 126 may change the algorithm of the auto framing processing according to the upper limit. In the same manner as described above, the processor 12 may not include the buffer and may directly input the video signal obtained by the camera 19 into the auto framing processor 152. In such a case, the delay time calculator 126 may select signal processing with the longest delay time less than or equal to the upper limit, such as the recurrent neural network or the LSTM.

The signal processing apparatus 1A performs highly accurate auto framing processing in a good communication environment, and performs the auto framing processing without delay to the extent that a user does not feel uncomfortable even in a poor communication environment. Therefore, the signal processing apparatus 1A is able to perform optimal auto framing processing according to the communication environment.

The foregoing embodiments are illustrative in all points and should not be construed to limit the present disclosure. The scope of the present disclosure is defined not by the foregoing embodiments but by the following claims for patent. Further, the scope of the present disclosure includes the scopes of the claims for patent and the scopes of equivalents.

What is claimed is:

1. A signal processing method comprising:
    obtaining, by a signal processing apparatus, a network delay time with respect to a device connected to the signal processing apparatus via a network;
    obtaining an input signal;
    determining an allowable upper limit of a delay time for an output signal corresponding to the obtained input signal based on the obtained network delay time and a total allowable delay time;
    selecting, from among a plurality of different signal processing operations respectively having a plurality of different delay times from each other, a first signal processing operation among the plurality of different signal processing operations having a longest delay time among the plurality of different delay times that is less than or equal to the allowable upper limit of the delay time;
    performing the first signal processing operation on the obtained input signal; and
    transmitting the obtained input signal on which the first signal processing operation has been performed, as the output signal, to the device connected to the signal processing apparatus via the network.

2. The signal processing method according to claim 1, wherein:
    each of the plurality of different signal processing operations includes processing to temporarily store data corresponding to the obtained input signal before signal processing is performed on the obtained input signal; and
    in the first signal processing operation, a first amount of data corresponding to the obtained input signal that is to be temporarily stored, and in a second signal processing operation among the plurality of different signal processing operations, a second amount of data corresponding to the obtained input signal is to be temporarily stored, the second amount of data being less than the first amount of data.

3. The signal processing method according to claim 2, wherein the first amount of data corresponding to the obtained input signal that is to be temporarily stored is determined based on the longest delay time that is less than or equal to the allowable upper limit of the delay time.

4. The signal processing method according to claim 1, wherein the first signal processing operation includes determining a target signal, based on the obtained input signal, and causing the target signal to pass.

5. The signal processing method according to claim 4, wherein the determining the target signal is performed by a machine-learned neural network.

6. The signal processing method according to claim 4, wherein the determining the target signal includes determination of voice or noise.

7. The signal processing method according to claim 6, wherein the first signal processing operation includes processing to reduce the noise.

8. The signal processing method according to claim 1, wherein:
    the first signal processing operation includes facial recognition processing;
    the obtained input signal includes a video signal; and
    the facial recognition processing includes auto framing processing to extract a face image from the video signal.

9. The signal processing method according to claim 1, wherein the network delay time is obtained based on information included in a protocol used for communication with the device connected to the signal processing apparatus via the network.

10. The signal processing method according to claim 1, wherein the network delay time is obtained at a start of a connection with the device connected to the signal processing apparatus via the network.

11. A signal processing apparatus comprising:
    a memory configured to store instructions; and
    a processor configured to execute the instructions stored in the memory to cause the signal processing apparatus to:
    obtain a network delay time with respect to a device connected to the signal processing apparatus via a network;
    obtain an input signal;
    determine an allowable upper limit of a delay time for an output signal corresponding to the obtained input signal based on the obtained network delay time and a total allowable delay time;
    select, from among a plurality of different signal processing operations respectively having a plurality of different delay times from each other, a first signal processing operation among the plurality of different signal processing operations having a longest delay time among the plurality of different delay times that is less than or equal to the allowable upper limit of the delay time;
    perform the first signal processing operation on the obtained input signal; and
    transmit the obtained input signal on which the first signal processing operation has been performed, as the output signal, to the device connected to the signal processing apparatus via the network.

12. The signal processing apparatus according to claim 11, wherein:
    each of the plurality of different signal processing operations includes processing to temporarily store data corresponding to the obtained input signal before signal processing is performed on the obtained input signal; and
    in the first signal processing operation, a first amount of data corresponding to the obtained input signal that is to be temporarily stored, and in a second signal processing operation among the plurality of different signal processing operations, a second amount of data corresponding to the obtained input signal is to be temporarily stored, the second amount of data being less than the first amount of data.

13. The signal processing apparatus according to claim 12, the first amount of data corresponding to the obtained input signal that is to be temporarily stored is determined based on the longest delay time that is less than or equal to the allowable upper limit of the delay time.

14. The signal processing apparatus according to claim 11, wherein the first signal processing operation includes determining a target signal, based on the obtained input signal, and causing the target signal to pass.

15. The signal processing apparatus according to claim 14, wherein the determining the target signal is performed by a machine-learned neural network.

16. The signal processing apparatus according to claim 14, wherein the determining the target signal includes determination of voice or noise.

17. The signal processing apparatus according to claim 14, wherein the first signal processing operation includes processing to reduce the noise.

18. The signal processing apparatus according to claim 11, wherein:
   the first signal processing operation includes facial recognition processing;
   the obtained input signal includes a video signal; and
   the facial recognition processing includes auto framing processing to extract a face image from the video signal.

19. The signal processing apparatus according to claim 11, wherein the network delay time is obtained based on information included in a protocol used for communication with the device connected to the signal processing apparatus via the network.

20. The signal processing apparatus according to claim 11, wherein the network delay time is obtained at a start of a connection with the device connected to the signal processing apparatus via the network.

\* \* \* \* \*